United States Patent [19]

Takamatsu et al.

[11] Patent Number: 4,792,917
[45] Date of Patent: Dec. 20, 1988

[54] CONTROL APPARATUS FOR SIMULTANEOUS DATA TRANSFER

[75] Inventors: Hisashi Takamatsu; Hisaharu Takeuchi; Yoshiro Shiroyanagi, all of Odawara, Japan

[73] Assignee: Hitachi, Ltd., Tokyo, Japan

[21] Appl. No.: 947,081

[22] Filed: Dec. 29, 1986

[30] Foreign Application Priority Data

Dec. 28, 1985 [JP] Japan .................. 60-293559

[51] Int. Cl.⁴ .............................................. G06F 12/08
[52] U.S. Cl. .................................................. 364/900
[58] Field of Search .................. 360/22, 98; 369/32, 369/34, 35, 178, 180, 195, 199; 364/200 MS File, 900 MS File

[56] References Cited

U.S. PATENT DOCUMENTS

| | | | |
|---|---|---|---|
| 3,774,172 | 11/1973 | Silverman | 369/32 X |
| 3,997,876 | 12/1976 | Frush | 364/200 |
| 4,371,929 | 2/1983 | Brann et al. | 364/200 |
| 4,392,162 | 7/1983 | Yamamoto | 360/22 X |
| 4,476,526 | 10/1984 | Dodd | 364/200 |
| 4,498,146 | 2/1985 | Martinez | 364/900 |
| 4,577,240 | 3/1986 | Hedberg et al. | 360/22 |

*Primary Examiner*—Thomas M. Heckler
*Attorney, Agent, or Firm*—Antonelli, Terry & Wands

[57] ABSTRACT

An apparatus for controlling data transfer between a rotary storage device such as a magnetic disk having a plurality of heads for different tracks and another storage device such as a disk cache includes a plurality of transfer circuits for the purpose of simultaneous data transfer to and from a plurality of tracks. The transfer circuits operate concurrently with and independently of each other to transfer data therethrough and other than noting the regions to be skipped over, ignoring data format on the track. The apparatus is suitable for preloading a disk cache from a disk.

20 Claims, 3 Drawing Sheets

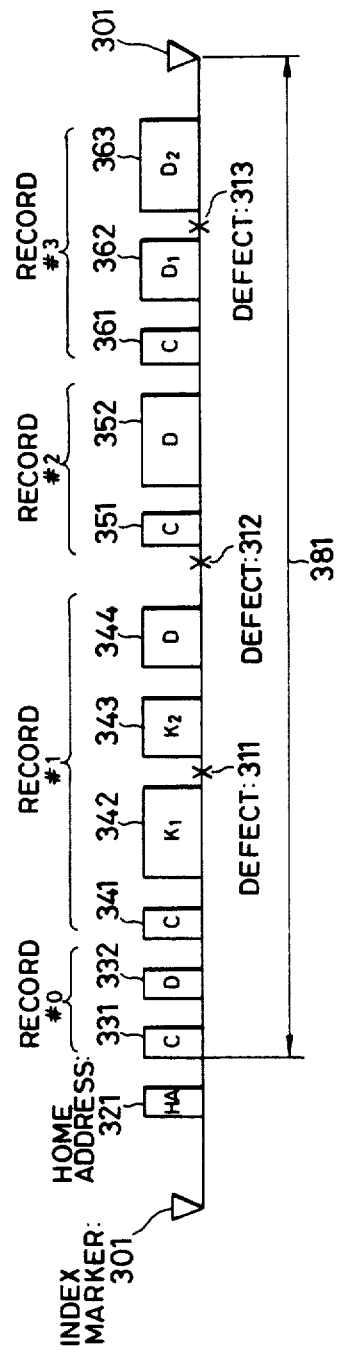
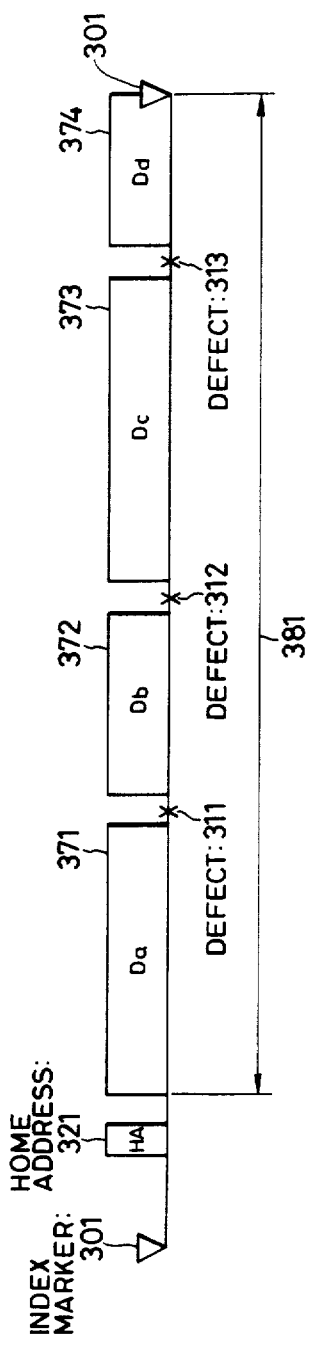

CONTROL APPARATUS FOR SIMULTANEOUS DATA TRANSFER

BACKGROUND OF THE INVENTION

The present invention relates to data transfer between a rotary storage device and another storage device (e.g., between a magnetic disk and a disk cache). More particularly, the present invention pertains to simultaneous data transfer for a plurality of tracks between such storage devices.

Rotary storage devices, which are typically represented by magnetic disks, are suitable for storing a large amount of data but disadvantageously involve a long access time and a low data transfer rate. A disk cache subsystem such as that disclosed in U.S. Pat. No. 3,569,938 is one means for overcoming the above-described disadvantages of the rotary storage devices. However, when data transfer is between a disk cache and a disk, there is still room for improvement insofar as the mechanism for transferring data is concerned.

FIG. 1 shows one example of disk cache subsystems. Disk control units (DKC's) 101 and 102 are connected to the same CPU or different CPU's through channel interfaces 111 and 112, respectively. A cache memory 121 is shared by the DKC's 101 and 102. N disk drive units (DKU's) 141a to 141n are connected to the DKC's 101 and 102 through device interfaces 131 and 132, respectively.

When the DKC 101 (or 102) receives a data read request directed to one of the DKU's (e.g., DKU #i) through the channel interface 111 (or 112), the DKC 101 (or 102) searches the cache memory 121. If the requested data is present in the cache memory 121, that is, if a read-hit occurs, the data is transferred from the cache memory 121 to the CPU, and no access to the DKU #i is effected. On the other hand, if the requested data is not present in the cache memory 121, that is, if a read-miss occurs, the DKC 101 (or 102) establishes connection to the DKU #i through the device interface 131 (or 132), reads out the requested data from the DKU #i and sends it to the CPU.

When a read-miss occurs, that is, when required data is read out from a disk, a considerably long time is consumed in seeking for the track and waiting for the disk rotation. In addition to that, since the data transfer rate is limited by the rotational speed of the disk, the time required to respond to a data read request is undesirably extended. On the other hand, when a read-hit occurs, that is, when data transfer is effected from the cache memory, there is no such latency time nor restriction on the data transfer rate, and therefore the response time is favorably short. Accordingly, it is important to enhance the probability of a read-hit occurring. For this purpose, an operation which is known as preloading is generally carried out. In preloading, when a disk is accessed due to an occurrence of a read-miss, data stored on a track including the requested data and data on the following several tracks are pre-loaded into the cache memory. This measure is taken on the basis of the statistical fact that there is a strong probability that data which is in the vicinity of data which has once been accessed will be accessed in the near future.

However, during preloading, the DKC and DKU which are involved therein are kept connected with each other, which means that this DKC cannot respond for another service request. In a store-in type cache memory, the same problem arises also when the contents of a certain block in the cache memory are transferred to a disk for swapping. The time required for data transfer in such cases is desired to be as short as possible.

Generally speaking, it may be obvious that the time required for data transfer is shortened by effecting data transfer for a plurality of tracks in parallel. Japanese Pat. Laid-Open No. 108915/1980 discloses one type of mechanism in which the time required for reading and writing data is shortened by carrying out data transfer for a plurality of tracks in parallel. However, this mechanism is arranged such that a plurality of bits which constitute each character are written and read in parallel by means of a plurality of heads, which means that this mechanism cannot be employed to transfer independent data on different tracks. It is general practice to adopt the variable length recording system for magnetic disks. In this system, data on different tracks are respectively made up of records having different lengths, and each record has a specific field for storing data which indicates the length of the record. Further, if the recording surface has any defect, the data which is written therein is kept away from the defect. The position of such defects usually differs from track to track. Therefore, the reading and writing of this type of data requires a considerably complicated control, and such a control is generally carried out by a processor in a DKC. Accordingly, if parallel data transfer for a plurality of tracks is implemented in a straight forward manner, it is necessary to provide as many processors as the number of tracks which are handled in parallel.

SUMMARY OF THE INVENTION

It is an object of the present invention to provide a transfer control apparatus which is capable of effecting simultaneous data transfer for a plurality of independent tracks between a rotary storage device and another storage device by means of a reduced amount of hardware.

It is another object of the present invention to provide a transfer control apparatus of the type described above which is suitable for preloading data from a rotary storage device to a cache memory associated therewith.

To transfer data for the whole track, identification of individual records or fields is not necessarily needed. Such identification can be made when it is actually needed. According to the present invention, there are provided circuits for carrying out data transfer without regard to data format, that is, without effecting any control concerning the structures of records on tracks and fields in individual records. There are provided at least as many such transfer circuits as the desired number of tracks for which simultaneous data transfer is to be effected, and these circuits are arranged to operate concurrently with and independently of each other. Since the structure of such transfer circuits is relatively simple, it is possible to realize simultaneous data transfer for a plurality of independent tracks by means of a reduced amount of hardware. As a result, the improvement in system performance by adoption of the simultaneous data transfer mechanism can be achieved at a reduced cost.

The above and other objects, features and advantages of the present invention will become clear from the following description taken in conjunction with the accompanying drawings.

BRIEF DESCRIPTION OF THE DRAWINGS

FIGS. 3(a) and 3(b) depict views for illustrating the handling of track format in the embodiment shown in FIG. 2.

DETAILED DESCRIPTION OF THE PREFERRED EMBODIMENT

Figure 2:
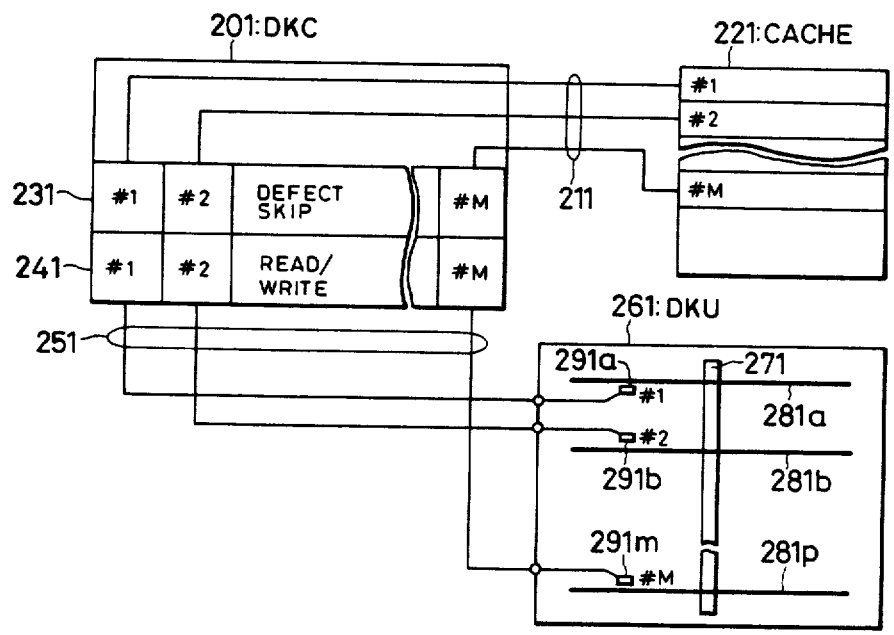
FIG. 2 is a block diagram of one embodiment of the present invention.

FIG. 2 shows a transfer control circuit in accordance with one embodiment of the present invention which is adapted for simultaneously preloading data stored on M tracks. A DKC 201 is connected to a cache memory 221 through a cache interface 211 and further connected to a DKU 261 through a device interface 251. In the DKU 261, a spindle 271 supports and rotates a plurality of magnetic disks 281a to 281p. M read/write heads (#1 to #M) 291a to 291m are provided in opposing relation to the recording surfaces of these magnetic disks 281a to 281p, the read/write heads being moved together in one unit by a known head driving mechanism (not shown) and positioned at a designated cylinder position.

Signal lines which are connected to the heads 291a to 291m together constitute the device interface 251 and are respectively connected to M read/write control circuits (#1 to #M) 241 within the DKC 201. Each of the read/write control circuits 241 effects signal processings such as modulation, demodulation and serial-parallel conversion, the control circuits 241 being the same as the corresponding circuits in conventional magnetic disk systems. The read/write control circuits 241 are respectively connected to M defect skip control circuits (#1 to #M) 231. These defect skip control circuits 231 operate to skip over defect regions of tracks and will be described later in detail. The defect skip control circuits 231 are connected to the cache memory 221 through the cache interface 211.

In the cache memory 221, the cache interface 211 is logically connected to M areas (#1 to #M) designated as preload destinations through an access control mechanism (not shown). Each of the areas has at least a capacity which is equal to the total capacity of a user area on one track. By means of the above-described arrangement, M independent data transfer paths which extend from the M heads to the cache memory are formed, and it is possible to simultaneously preload data from the M tracks.

In general, data is recorded on a magnetic disk according to the variable length recording system, and several defects per track are allowed. Accordingly, the disposition of records and fields on the track differs widely from track to track. FIG. 3(a) shows one example of track format. An index marker 301 indicates the start and end point of a track. In a home address (HA) 321 are stored a cylinder number and a head number as data for identifying this track, together with defect locations, that is, the distances from the index marker 301 to defect sections. In the illustrated example, three defects 311, 312 and 313 are present. A predetermined length of section around each defect is used neither for recording significant data nor as a significant gap (e.g., IRG). Various fields are recorded subsequently to the HA 321 in the following sequence with a predetermined gap provided between each pair of adjacent field namely, a count fields 331 and a data field 332 which define a record #0; a count field 341, key fields 342 and 343 separated from each other due to the existence of the defect 311, and a data field 344, which define a record #1; a count field 351 and a data field 352 shifted due to the existence of the defect 312, which define a record #2; and a count field 361, and data fields 362 and 363 separated from each other due to the existence of the defect 313, which define a record #3. In each count (C) field are recorded the cylinder number, the head number and the defect locations, together with the record number of the record concerned, the length of its key (K) field and the length of its data (D) field. An area 381 from the top of th record #0 to the index marker 301 defines a so-called user area which can be utilized for recording data.

In normal reading and writing operations, a control concerning data format is effected using the key length, data length and defect location for each record. For instance, in a reading operation, the identification of each record, identification of each field in a record and skipping over the defect sections are carried out using the contents of the HA 321 and the contents of the C field in each record. Such control is considerably complicated and effected by a control processor provided in the DKC. If data were simultaneously read out from M independent tracks according to the above-described system, it would be necessary to provide M control processors.

Figure 1:
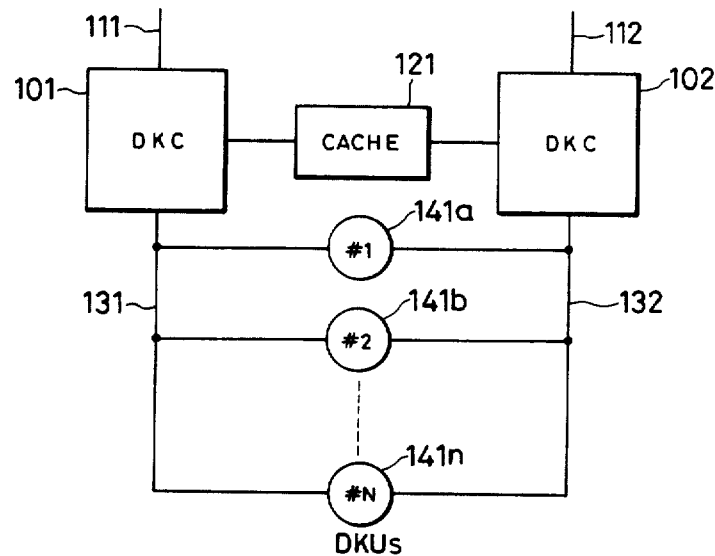
FIG. 1 is a block diagram of one example of a disk cache subsystem to which the present invention may be applied.

In this embodiment, a control concerning data format, such as that described above, is omitted for pre-loading. More specifically, as shown in FIG. 3(b), the user area 381 is not divided into individual records and individual field within each record, and the user area 381 is handled as if the whole area were constituted by a series of data fields 371 to 374 (Da to Dd) which are separated from each other by the defects 311 to 313 alone. The position and length of each of these virtual data fields Da to Dd are determined only by the positions of the defects 311 to 313 and are independent of the position and length of each individual record and the position and length of each indifidual field in a record. The position of each defect is recorded in the HA 321. Accordingly, in a reading operation for preloading, only the skipping over of defect sections according to the contents of the HA 321 is carried out by each of the defect skip control circuits 231 (see FIG. 1).

Figure 4:
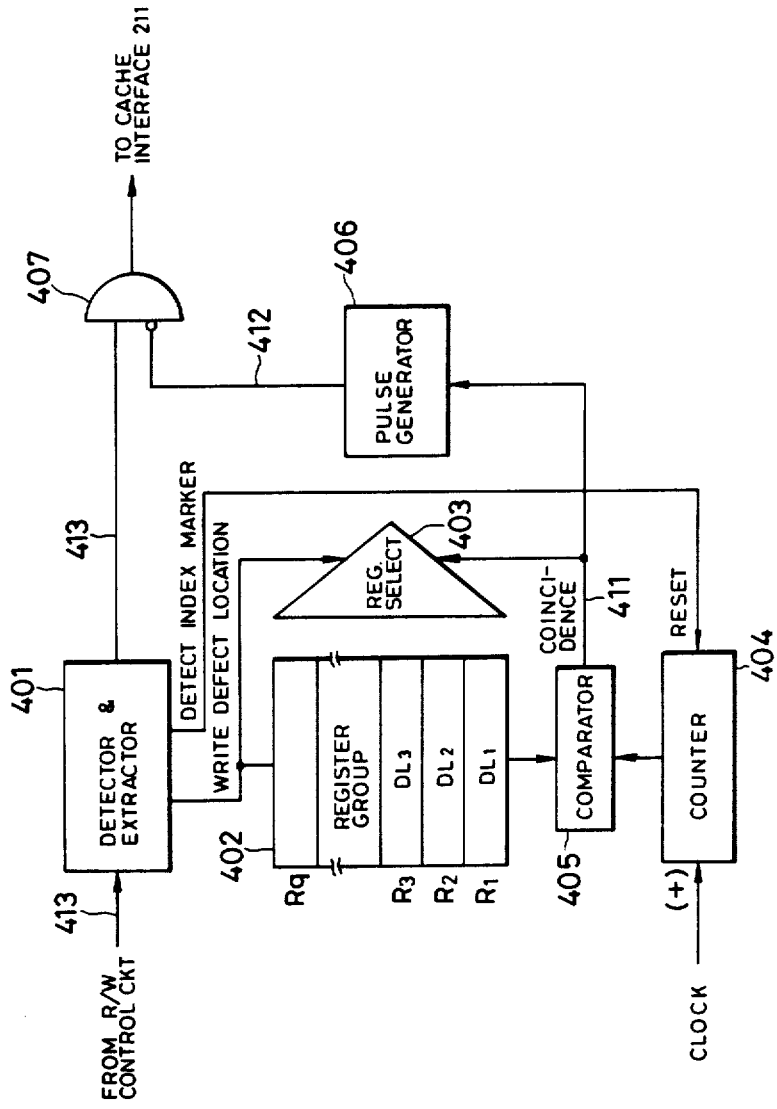
FIG. 4 is a block diagram showing in more detail one of the defect skip control circuits in the arrangement illustrated in FIG. 2.

FIG. 4 shows one example of the defect skip control circuits 231. A detector and extractor circuit 401 checks a raw pulse train 413 supplied from the associated read/write control circuit 241 to detect the index aarker 301 and then extracts the HA 321. The defect position data (e.g., $DL_1$, $DL_2$, $DL_3$, etc. corresponding to the defects 311, 312, 313, etc.) exrracted from the HA are stored in a register group 402. A register select circuit 403 successively selects registers $R_1$, $R_2$, $R_3$ and so on for successive operations of writing those defect position data. When all the defect position data have been stored, the register select circuit 403 selects the register $R_1$ for reading. The defect position data indicate the respective start positions of the defect sections. A counter 404 is reset when the index marker 301 is detected, and then counts the number of clock pulses.

A comparator 405 makes a comparison between the contents (the first defect position $DL_1$) of the register R₁ first selected by the register select circuit 403 and the count of the counter 404. When coincidence therebetween is detected, the comparator 405 generates a coincidence signal 411. The signal 411 activates a pulse generator 406 to generate a pulse 412 with a duration corresponding to the length of the defect section on the track, the pulse 412 inhibiting a gate 407. The gate 407 normally allows the raw pulse train 413 to pass therethrough so as to be supplied to the cache interface 211, but when supplied with the pulse 412, the gate 407 inhibits the passage of the raw pulse train 413. The coincidence signal 411 is further used to control the register select circuit 403 so as to select the next register (the register R₂ holding the second defect position data DL₂, at this time) for reading. In this way, raw pulses within each defect section are skipped, and the virtual data regions Da to Dd shown in FIG. 3(b) are continuously written into the cache memory 221.

The data thus written into the cache memory 221 includes not only count fields, key fields and data fields but also error correction codes and gap regions. Error correction by means of error correction codes and gap elimination may be effected by the DKC 201 on receipt of each data request form the CPU.

In the above-described embodiment, the defect skip control circuits 231 and the read/write control circuits 241 are provided for all of the existing M heads, thereby allowing the simultaneous preloading of data from M tracks. However, in a system designed to preload data from a smaller number of tracks, it suffices to provide as many defect skip control circuits 231 and read/write control circuits 241 as the designed number of tracks from which preloading is to be effected, and arrange these circuits so as to be selectively connected to any series of heads by a switching circuit.

The defect skip control circuits 231 fo skipping defect sections are provided to cope with disturbance of timing control caused by noise which may be generated in defect sections. Accordingly, if such disturbance problem is overcome, the defect skip control circuits 231 may be omitted.

Further, in a store-in type disk cache subsystem, it is advantageous to apply the present invention also to data transfer from a cache memory to a disk. For this purpose, each defect skip control circuit 231 is provided with a mechanism which is similar to that shown in FIG. 4 and which inserts gaps corresponding to defect sections into data sent from the cache memory to the associated read/write control circuit.

To a disk system of the type in which a group of data bits are recorded on a group of tracks in parallel, such as that disclosed in the above-described Japanese Patent Laid-Open No. 108915/1980, the present invention may be applied in the form of simultaneous data transfer for a plurality of groups of tracks.

What we claim is:

1. An apparatus for controlling data transfer between a rotary storage device, having a plurality of heads for different tracks therein, and another storage device, comprising:
    a plurality of transfer circuit means each being coupled so as to operate concurrently with and independently of the other of said transfer circuit means for transferring data therethrough and irrespective of data format of the data to be transferred from the respective corresponding tracks; and
    means for simultaneously connecting said plurality of transfer circuit means between said another storage device and said plurality of heads corresponding in number to said plurality of transfer circuit means.

2. An apparatus for controlling data transfer according to claim 1, wherein said another storage device is a cache memory associated with said rotary storage device, and said plurality of transfer circuit means including means for effecting concurrent data transfer from said tracks of said rotary storage device during at least a preloading operation for storing unto respective storage locations of said cache memory.

3. An apparatus for controlling data transfer according to claim 2, wherein each of said plurality of transfer circuit means includes skip control circuit means for effecting in the skipping of defect regions present on a track.

4. An apparatus for controlling data transfer according to claim 3, wherein each of said tracks includes a region for holding data indicating respective positions of defects thereon, and each said skip control circuit means includes means for extracting said defect position data from a signal train read out of a track, means responsive to said defect position data for determining an operating point corresponding to each defect position, and means activated at said operating point for inhibiting data from being transferred during a predetermined period of time beginning at said operating point.

5. An apparatus for controlling data transfer according to claim 4, wherein said means for extracting includes a detector and extractor for detecting from incoming data an index marker indicating the beginning of said track and extracting a home address data field which includes information for identifying said track and the respective locations of track defects; said means for determining an operating point including a register select circuit, a storage register having a plurality of storage locations, a clock pulse counter and a coincidence circuit, wherein said register select circuit sequentially selects storage locations available in said storage register for successively writing therein defect position data of said track in response to write defect location data outputted by said detecting and extracting means, said clock pulse counter is coupled to receive successive clock pulses and is coupled to said detecing and extracting means wherein said counter is reset in response to each index marker detected and said coincidence circuit, coupled to both said storage register and to said counter, for outputting a coincidence signal in response to the resetting of said clock pulse counter and defect position data selected from a respective storage location of said storage register; and wherein said means for inhibiting data includes a logic gate coupled to said detector and extractor and to an output of said coincidence circuit for inhibiting passage therethrough of said track data during time periods indicative of track defect lengths.

6. An apparatus for controlling data transfer according to claim 5, wherein said coincidence circuit is a comparator and wherein said logic gate is an AND logic gate including one input directly coupled to receive track data and a second signal inverting input coupled to an output of said comparator via a pulse shaping and duration control generator.

7. An apparatus for controlling data transfer according to claim 3, wherein each track includes a region for holding data indicating respective positions of defects thereon, and each said skip control circuit means includes detecting and extracting means for detecting from incoming data an index marker indicating the beginning of said track and extracting a home address data field which includes information for identifying said track and the respectie locations of track defects; a register select circuit, a storage register having a plurality of storage locations, a clock pulse counter and a coincidence circuit, wherein said register select circuit sequentially selects storage locations available in said storage register for successively writing therein defect position data of said track in response to write defect location data outputted by said detecting and extracting means, said clock pulse counter is coupled to receive sucessive clock pulses and is coupled to said detecting and extracting means wherein said counter is reset in response to each index marker detected and said coincidence circuit, coupled to both said storage register and to said counter, for outputting a coincidence signal in response to the resetting of said clock pulse counter and defect position data selected from a respective storage location of said storage register; and

- logic means for inhibiting data transfer including an inhibit logic gate coupled to said detecting and extracting means and to an output of said coincidence circuit for inhibiting passage therethrough of said track data during time periods indicative of track defect lengths.

8. An apparatus for controlling data transfer according to claim 1, wherein said plurality of transfer circuit means and said plurality of heads comprises at least two transfer circuit means and heads, respectively.

9. An apparatus for controlling data transfer according to claim 2, wherein said preloading operation corresponds to a loading time prior to a request operation for that data.

10. An apparatus for controlling data transfer according to claim 9, wherein said request operation being a read operation.

11. An apparatus for controlling data transfer between a rotary storage device having a plurality of heads for different tracks therein and a cache memory device, comprising:
- a plurality of transfer circuit means, each one for transferring data irrespective of actual data format on individual tracks, each of said transfer circuit means operating concurrently with and independently of the other transfer circuit means; and
- means for simultaneously connected said transfer circuit means between respective storage locations of said cache memory device and said plurality of heads corresponding in number to said plurality of transfer circuit means.

12. An apparatus according to claim 11, wherein said plurality of transfer circuit means concurrently transfer data into respective storage locations in said cache memory device from said rotary storage device during a loading operation.

13. An apparatus according to claim 12, wherein each of said plurality of transfer circuit means includes skip control circuit means for effecting in the skipping of defect regions present on a track.

14. An apparatus according to claim 13, wherein each of said tracks includes a region for holding data indicating respective positions of defects thereon, and each said skip control circuit means includes means for extracting said defect position data from a signal train read out of a track, means responsive to said defect position data for determining an operating point corresponding to each defect position, and means activated at said operating point for inhibiting data from being transferred during a predetermined period of time beginning at said operating point.

15. An apparatus according to claim 14, wherein said means for extracting includes a detector and extractor for detecting from incoming data an index marker indicating the beginning of said track and extracting a home address data field which includes information for identifying said track and the respective locations of track defects; said means for determining an operation point including a register select circuit, a storage register having a plurality of storage locations, a clock pulse counter and a coincidence circuit, wherein said register select circuit sequentially selects storage locations available in said storage register for successively writing therein defect position data of said track in response to write defect location data outputted by said detector and extractor, said clock pulse counter is coupled to receive successive clock pulses and is coupled to said detector and extractor wherein said counter is reset in response to each index marker detected, and said coincidence circuit, coupled to both said storage register and to said counter, outputting a coincidence signal in response to the resetting of said clock pulse counter and defect position data selected from a respective storage location of said storage register; and wherein said means for inhibiting data includes a logic gate coupled to said detector and extractor and to an output of said coincidence circuit for inhibiting passage therethrough of said track data during time periods indicative of tract defect lengths.

16. An apparatus according to claim 15, wherein said coincidence circuit is a comparator and wherein said logic gate is an AND logic gate including one input directly coupled to receive track data and a second signal inverting input coupled to an output of said comparator via a pulse shaping and duration control generator.

17. An apparatus according to claim 13, wherein each track includes a region for holding data indicating respective positions of defects thereon, and each said skip control circuit means includes detecting and extracting means for detecting from incoming data an index marker indicating the beginning of said track and extracting a home address data field which includes information for identifying said track and the respective locations of track defects; a register select circuit, a storage register having a plurality of storage locations, a clock pulse counter and a coincidence circuit, wherein said register select circuit sequentially selects storage locations available in said storage register for successively writing therein defect position data of said track in response to write defect location data outputted by said detecting and extracting means, said clock pulse counter is coupled to receive successive clock pulses and is coupled to said detecting and extracting means wherein said counter is reset in response to each index marker detected and said coincidence circuit, coupled to both said storage register and to said counter, for outputting a coincidence signal in response to the resetting of said clock pulse counter and defect position data selected from a respective storage location of said storage register; and

- logic means for inhibiting data transfer including an inhibit logic gate coupled to said detecting and extracting means and to an output of said coincidence circuit for inhibiting passage therethrough of said track data during time periods indicative of track defect lengths.

18. An apparatus according to claim 11, wherein said plurality of transfer circuit means and said plurality of heads comprises at least two transfer circuit means and heads, respectively.

19. An apparatus according to claim 12, wherein said loading operation is a preloading operation corresponding to a loading time prior to a request operation for that data.

20. An apparatus according to claim 19, wherein said request operation being a read operation.

* * * * *